(12) United States Patent
Kuwagata et al.

(10) Patent No.: US 11,215,581 B2
(45) Date of Patent: Jan. 4, 2022

(54) ELECTRIC TRANSMISSION MECHANISM AND ION METER

(71) Applicant: Yokogawa Electric Corporation, Tokyo (JP)

(72) Inventors: Takeshi Kuwagata, Tokyo (JP); Megumi Goto, Tokyo (JP); Hikaru Shimizu, Tokyo (JP); Saori Handa, Tokyo (JP); Yukiko Hirano, Tokyo (JP); Masaru Homma, Tokyo (JP); Atsushi Otaki, Tokyo (JP); Hideyuki Yagihashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 314 days.

(21) Appl. No.: 16/392,062

(22) Filed: Apr. 23, 2019

(65) Prior Publication Data

US 2019/0331640 A1    Oct. 31, 2019

(30) Foreign Application Priority Data

Apr. 27, 2018 (JP) .............................. JP2018-087699

(51) Int. Cl.
*G01N 27/48*    (2006.01)
*G01N 27/30*    (2006.01)
*F16H 7/02*    (2006.01)

(52) U.S. Cl.
CPC ............. *G01N 27/48* (2013.01); *G01N 27/30* (2013.01); *F16H 7/023* (2013.01)

(58) Field of Classification Search
CPC ...... F16H 7/023; G01N 27/286; G01N 27/30; G01N 27/48
See application file for complete search history.

(56) References Cited

U.S. PATENT DOCUMENTS

2004/0084327 A1* 5/2004 Balisky .................. G01N 27/48
205/775

FOREIGN PATENT DOCUMENTS

JP    2008-164408 A    7/2008

* cited by examiner

*Primary Examiner* — Gurpreet Kaur
(74) *Attorney, Agent, or Firm* — Sughrue Mion, PLLC

(57) ABSTRACT

An electric transmission mechanism according to one aspect of the present invention may include a tubular ring fixed to a shaft electively connected to an electrode, at least one brush slidably contacting with a circumferential surface of the ring, a bearing including an inner race fixed to the ring, and a housing which is fixed to an outer race of the bearing and accommodates a contact part of the ring and the brush therein.

20 Claims, 9 Drawing Sheets

ELECTRIC TRANSMISSION MECHANISM AND ION METER

BACKGROUND

Field of the Invention

The present invention relates to an electric transmission mechanism and an ion meter.

The present application claims priority based on Japanese patent application 2018-087699, filed on Apr. 27, 2018 and includes herein by reference the content thereof.

Background

An ion meter which uses a polarographic method, for example, a residual chlorine analyzer disclosed in Japanese Unexamined Patent Application, First Publication No. 2008-164408 is known. Such an ion meter measures an ion concentration on the basis of a current flowing by applying a voltage between two electrodes including a working electrode and a reference electrode. For example, the working electrode which is one electrode is constantly rotated using a motor. The ion meter, which rotates the working electrode, extracts the current from the electrode which is continuously rotated, by a so-called slip ring mechanism. Such a slip ring mechanism includes a ring attached to a conductive shaft provided with an electrode, and a conductive brush slidably contacting with a surface of the ring.

SUMMARY

A motor which generates power for rotating the electrode, and a power transmission mechanism which transmits the power generated by the motor to the electrode are installed around the slip ring mechanism. When dust generated by the operation of the motor and the power transmission mechanism enters between the ring and the brush, a conduction state between the ring and the brush deteriorates, and it interrupts the stable measurement of the current flowing through the electrode. Also, if a corrosive gas such as chlorine gas comes into contact with the ring or the brush, the surface of the ring or the brush deteriorates, and similarly, the conduction state between the ring and the brush deteriorates.

In this way, in the slip ring mechanism of the related art, since there is a possibility that the conduction state between the ring and the brush deteriorates due to the influence of external foreign matter (dust and corrosive gas), it is necessary to perform a maintenance such as a regular removal of dirt.

One aspect of the present invention provides an electric transmission mechanism including a ring and at least one brush slidably contacting with the circumferential surface of the ring in which there is no need for maintenance for maintaining conduction between the ring and the brush or the frequency thereof is low.

An electric transmission mechanism according to a first aspect of the present invention may include a tubular ring fixed to a shaft electively connected to an electrode, at least one brush slidably contacting with a circumferential surface of the ring, a bearing including an inner race fixed to the ring, and a housing which is fixed to an outer race of the bearing and accommodates a contact part of the ring and the brush therein.

Further features and aspects of the present disclosure will become apparent from the following detailed description of exemplary embodiments with reference to the attached drawings.

According to one aspect of the present invention, a tubular ring is fixed to an inner race of a bearing, and a housing portion fixed to an outer race of the bearing accommodates a contact part of the ring and the brush therein. For this reason, it is possible to prevent external foreign matters from entering the contact part of the ring and the brush, using the housing. Therefore, according to the one aspect of the present invention, in an electric transmission mechanism including the ring and the brush slidably contacting with the circumferential surface of the ring, there is no need for maintenance for maintaining conduction between the ring and the brush, or the frequency thereof can be reduced.

DETAILED DESCRIPTION OF THE INVENTION

Hereinafter, an embodiment of an electric transmission mechanism and an ion meter according to the present invention will be described with reference to the drawings. In the following embodiments, an example in which the present invention is applied to a residual chlorine analyzer (an ion meter) will be described. The present invention is not only applicable to the residual chlorine analyzer, but can also be suitably applied to an ion meter or the like which adopts a polarographic method.

Figure 1:
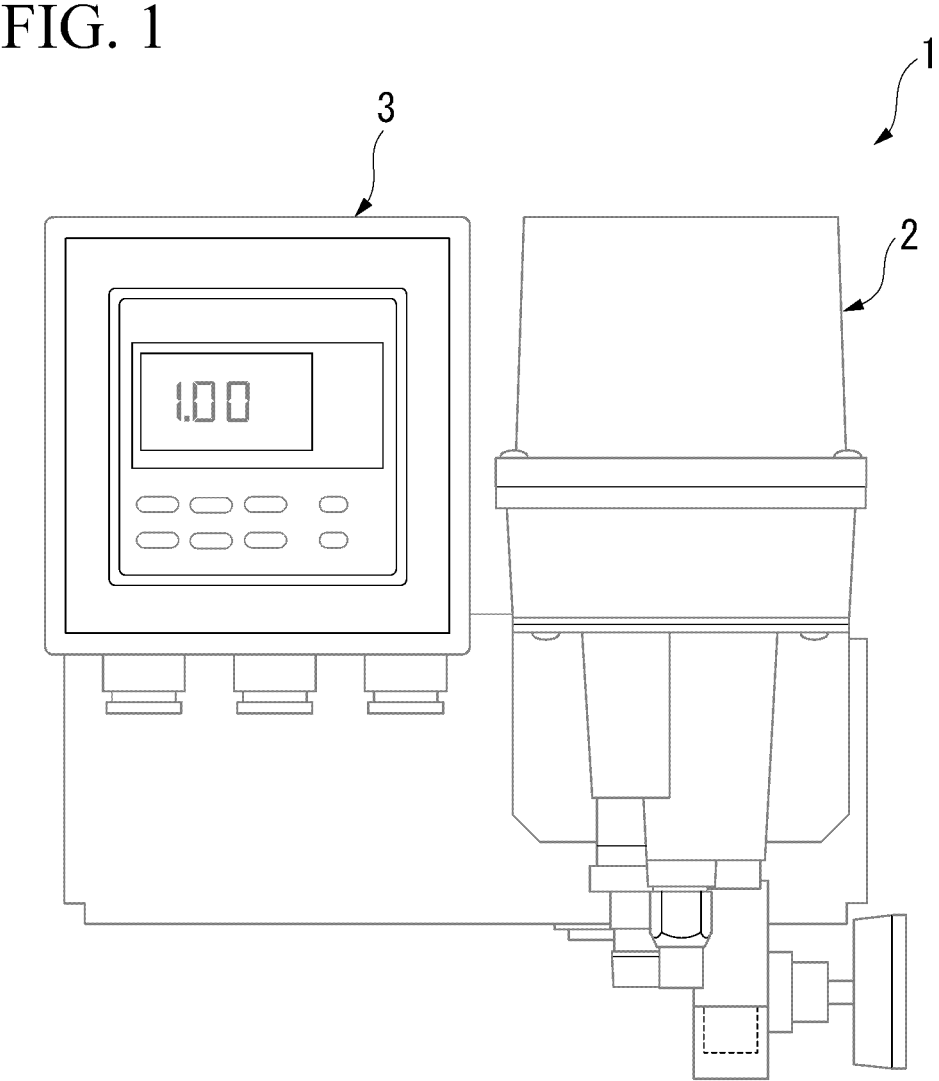
FIG. 1 is an external view of a residual chlorine analyzer including an electric transmission mechanism according to an embodiment of the present invention.

FIG. 1 is an external view of a residual chlorine analyzer 1 of the embodiment. As shown in the drawing, the residual chlorine analyzer 1 of the present embodiment includes a detector 2 and a converter 3. The detector 2 is a unit that obtains a diffusion current by electrolytic reduction of free chlorine contained in liquid to be measured such as water. The converter 3 is a unit which amplifies and computes a signal obtained from the detector 2. The converter 3 includes a manipulation unit serving as a user interface, a display unit which performs various displays, and the like. The detector 2 and the converter 3 are connected to each other by a cable (not shown).

Figure 2:
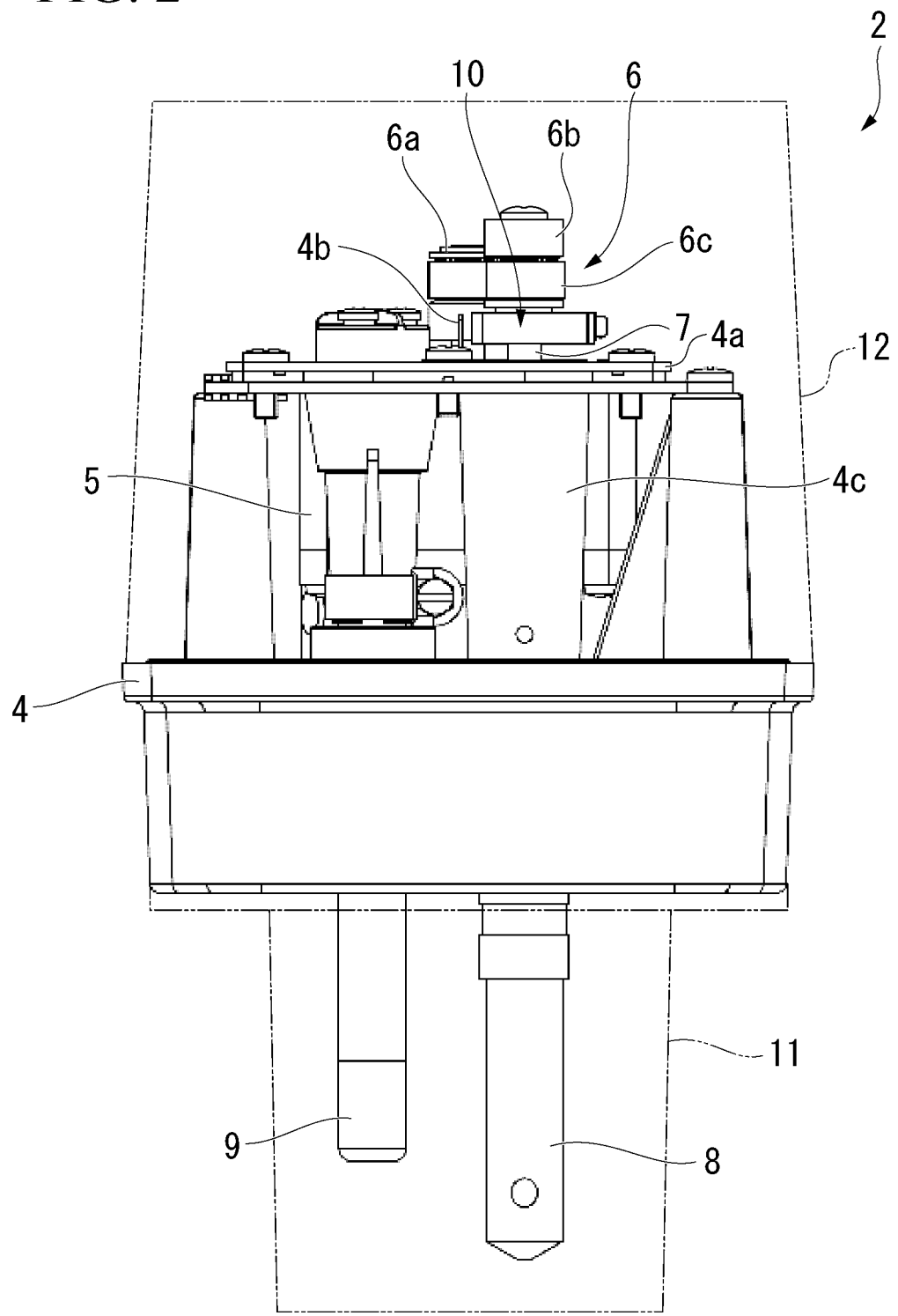
FIG. 2 is a front view showing a schematic configuration of a detector provided in the residual chlorine analyzer.

FIG. 2 is a front view showing a schematic configuration of the detector 2. As shown in the drawing, the detector 2 includes a base unit 4, a motor 5, a power transmission mechanism 6, a shaft 7, a working electrode 8 (a first electrode), a counter electrode 9 (a second electrode), an electric transmission mechanism 10 (an electric transmission structure, an electric transmission device), a measurement tank 11, and an upper cover 12.

The base unit 4 is a support member that directly or indirectly supports the motor 5, the power transmission mechanism 6, the shaft 7, the working electrode 8, the counter electrode 9, the electric transmission mechanism 10, the measurement tank 11 and the upper cover 12. The base unit 4 includes a plate 4a which supports the power transmission mechanism 6 and the like. A restriction plate 4b for restricting the rotation of the electric transmission mechanism 10 is erected on the plate 4a.

The motor 5 is mounted on the base unit 4 and generates power for rotating the working electrode 8 from electric power to be supplied from the outside. The power transmission mechanism 6 transmits the power generated by the motor 5 to the shaft 7. The power transmission mechanism 6 includes, for example, a gear head (not shown) connected to the output shaft of the motor 5, a driving pulley 6a fixed to the output shaft of the gear head, a driven pulley 6b fixed to an upper end of the shaft 7, and a driving belt 6c that is wound around the driving pulley 6a and the driven pulley 6b.

The shaft 7 is connected to the motor 5 via the power transmission mechanism 6, and is disposed so that a rotational axial center thereof is vertical. The shaft 7 is held to be rotatable about the rotational axial center by a shaft holder 4c provided on the base unit 4. The shaft 7 is made of a conductive material, and allows the converter 3 and the working electrode 8 to be electrically connected to each other via the electric transmission mechanism 10 and the like.

The working electrode 8 is a rotation electrode fixed to a lower end of the shaft 7 and rotated about the rotational axial center of the shaft 7 by the rotation of the shaft 7. For example, a female screw is formed at an upper end of the working electrode 8, and when a male screw formed at a lower end of the shaft 7 and the upper end of the working electrode 8 are screwed together, the working electrode 8 is fixed to the shaft 7. The counter electrode 9 is fixed with respect to the base unit 4, and is disposed lateral to the working electrode 8 in a state in which it is hung below the base unit 4 as shown in FIG. 2.

The electric transmission mechanism 10 is a component that is attached to the upper part of the shaft 7 and enables conduction between the working electrode 8 and the outside of the detector 2 via the rotated shaft 7. The electric transmission mechanism 10 will be described below in detail.

The measurement tank 11 is fixed to the lower part of the base unit 4 and is provided to surround the working electrode 8 and the counter electrode 9. The measurement tank 11 includes an inlet port capable of taking in the liquid to be measured from the outside to the inside, and an outlet port capable of discharging the liquid to be measured from the inside to the outside. The working electrode 8 and the counter electrode 9 are immersed in the liquid to be measured inside such a measurement tank 11. The upper cover 12 is fixed to the upper part of the base unit 4, and surrounds the motor 5, the power transmission mechanism 6, and the electric transmission mechanism 10.

In such a residual chlorine analyzer 1, when the power generated by the motor 5 is transmitted to the shaft 7 by the power transmission mechanism 6 in a state of immersing the working electrode 8 and the counter electrode 9 in the liquid to be measured, the shaft 7 is rotated and furthermore, the working electrode 8 is also rotated. A voltage is applied from the converter 3 to the working electrode 8 and the counter electrode 9. The current flowing through the working electrode 8 due to reduction reaction of chlorine flows through the converter 3 via the shaft 7 and the electric transmission mechanism 10. The converter 3 calculates the residual chlorine concentration on the basis of the value of the input current and outputs the calculation result thereof.

Figure 3:
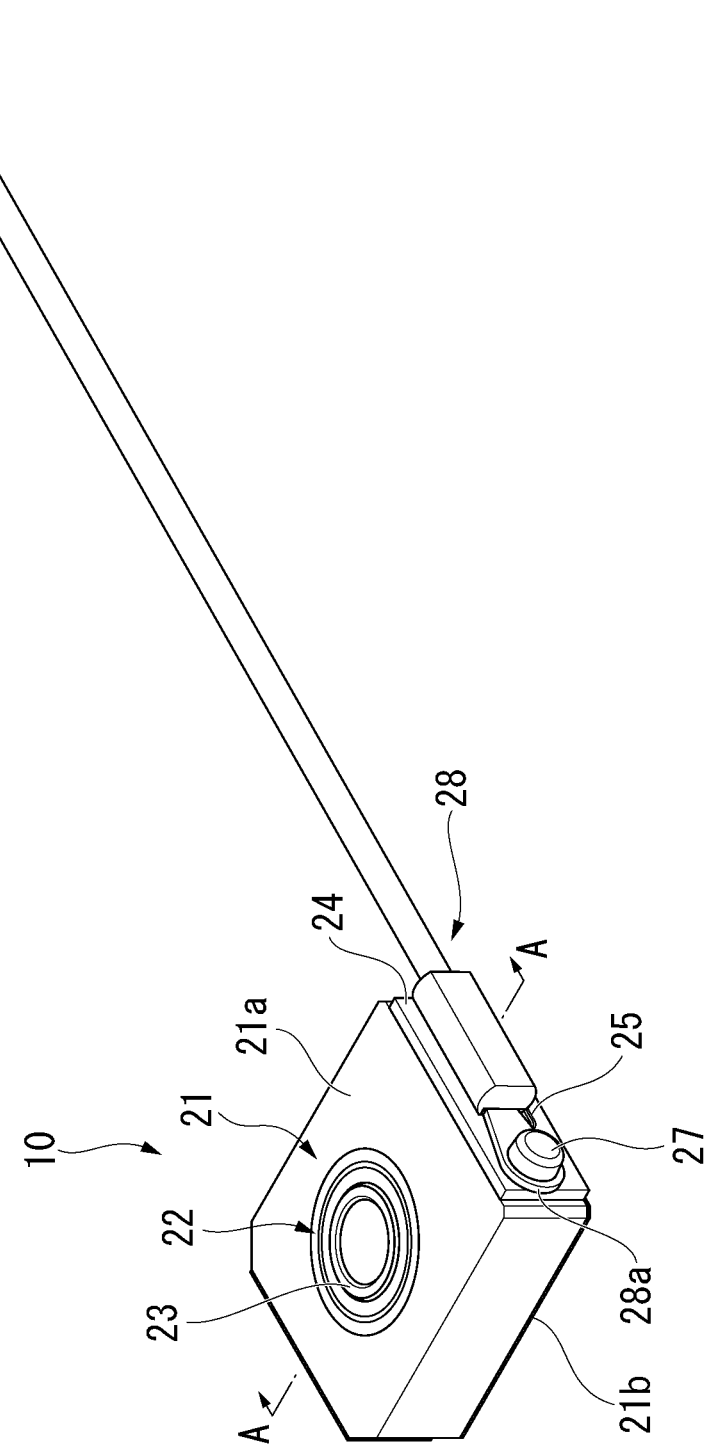
FIG. 3 is a perspective view of the electric transmission mechanism according to the embodiment of the present invention.
Figure 4:
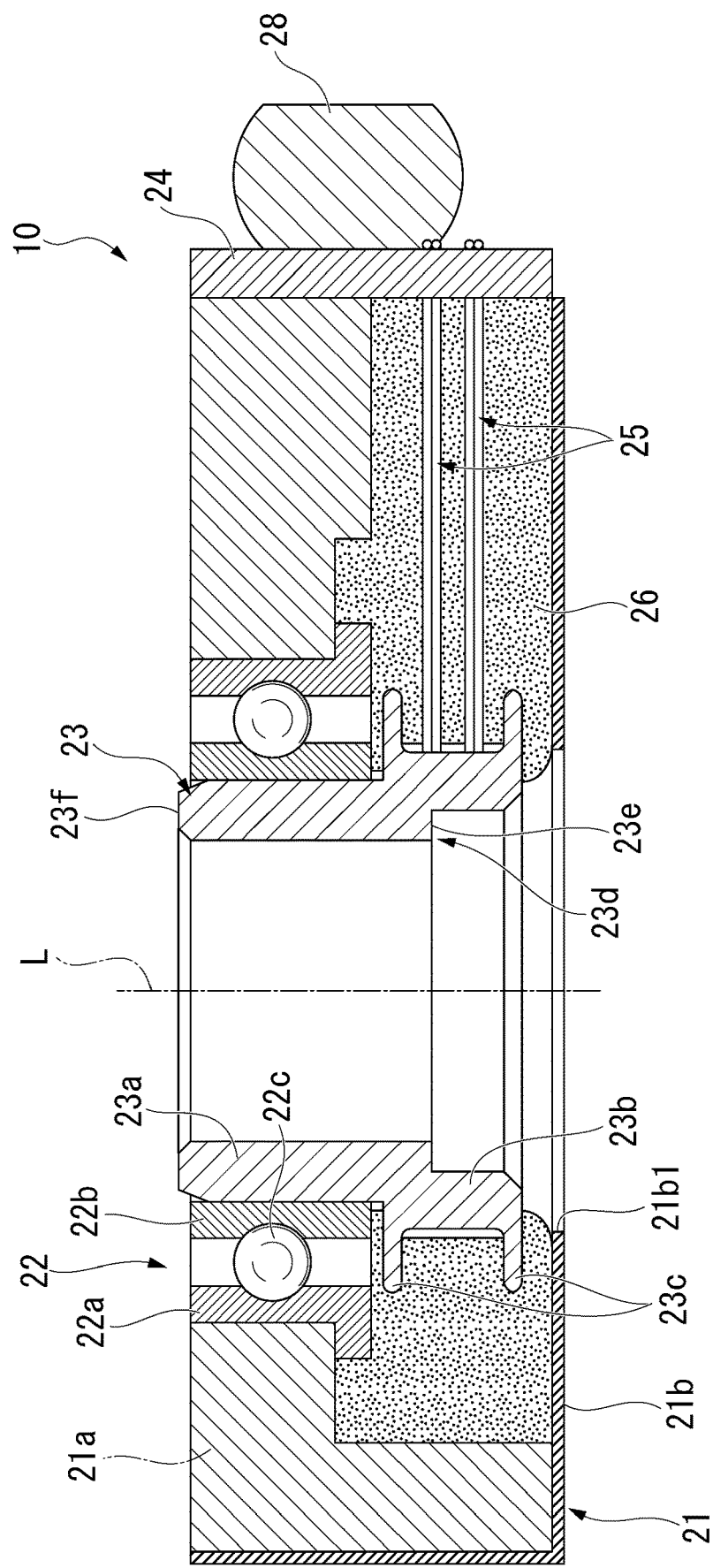
FIG. 4 is a cross-sectional view taken along a line A-A of FIG. 3.
Figure 5:
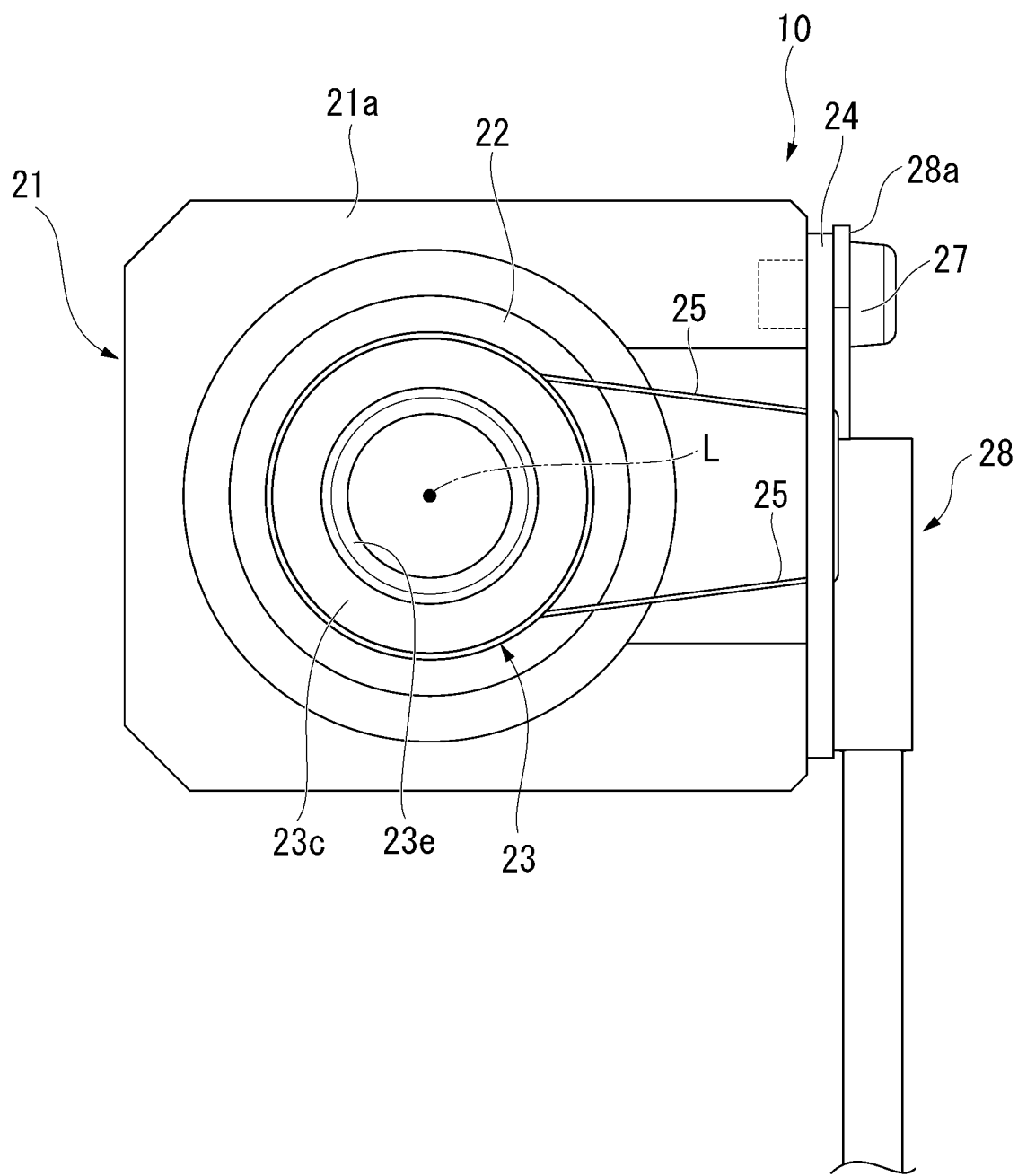
FIG. 5 is an enlarged view of a lower surface of the electric transmission mechanism according to the embodiment of the present invention.

Hereinafter, the electric transmission mechanism 10 will be described in detail. FIG. 3 is a perspective view of the electric transmission mechanism 10. FIG. 4 is a cross-sectional view taken along the line A-A of FIG. 3. FIG. 5 is an enlarged view of the lower surface of the electric transmission mechanism 10. In FIG. 5, a cover 21b of a housing 21 and grease 26, which will be described below, are omitted. As shown in these drawings, the electric transmission mechanism 10 includes a housing 21, a bearing 22, a ring 23, a connection plate 24, a brush 25, grease 26, a fixing screw 27, and a cable 28.

As shown in FIG. 4, the housing 21 has a container main body 21a opening downward, and a cover 21b which closes an open end of the container main body 21a. The container main body 21a has a circular penetration hole provided to penetrate an upper wall in a vertical direction, and an outer race of the bearing 22 is fitted into the penetration hole. As described above, when the bearing 22 is fitted into the container main body 21a, the housing 21 is fixed to the outer race of the bearing 22.

Figure 7:
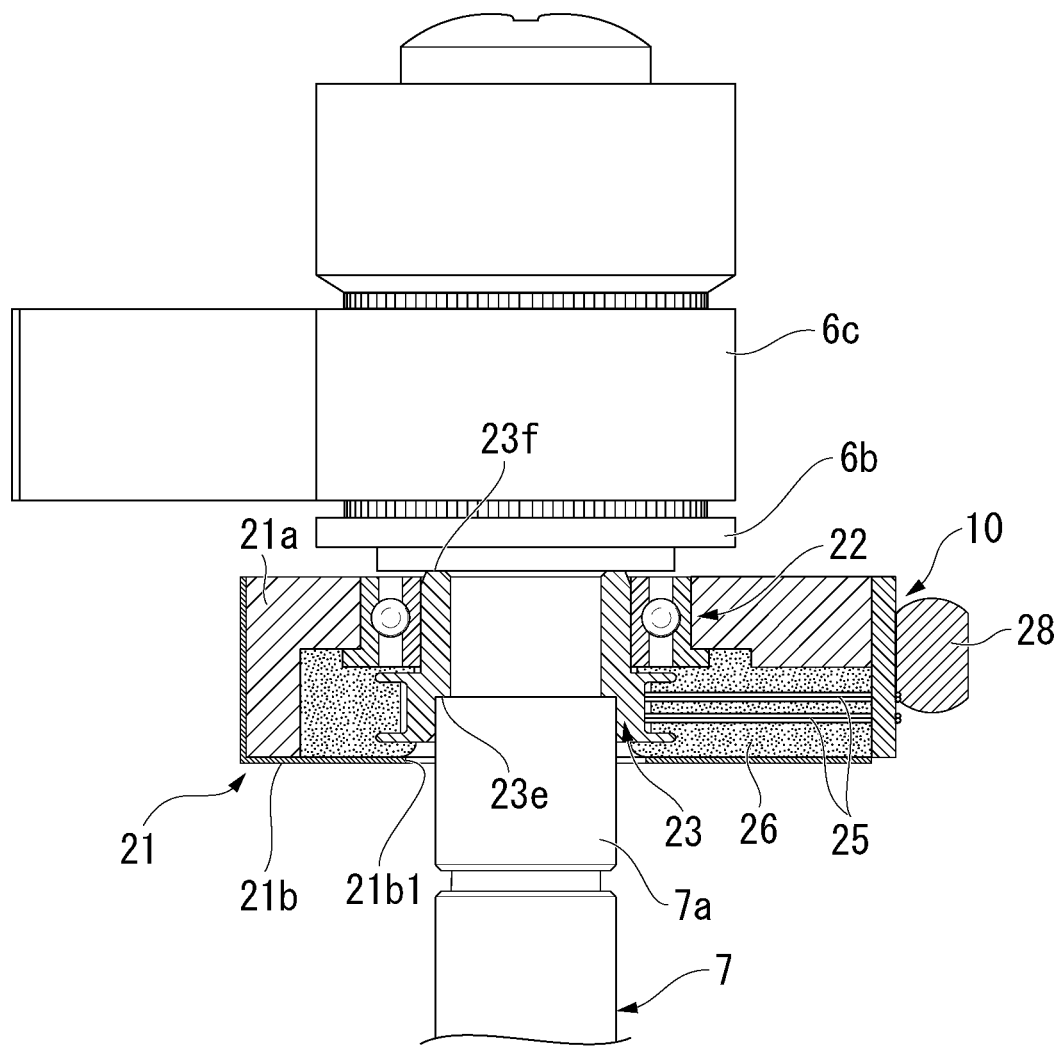
FIG. 7 is an enlarged cross-sectional view of a main part of the residual chlorine analyzer including the electric transmission mechanism according to the embodiment of the present invention.

The cover 21b is detachably fixed to a lower end edge of the container main body 21a using a screw (not shown). In other words, the cover 21b is attachable to and detachable from the container main body 21a so that a space surrounded by the container main body 21a can be opened and closed. As shown in FIGS. 4 and 7, the cover 21b has an opening 21b1 through which the shaft 7 is inserted, and which has a diameter dimension smaller than an outer diameter dimension of the ring 23. Such a cover 21b is disposed such that a circumferential edge region of the cover 21b forming the opening 21b1 overlaps an outer edge region of the ring 23 when viewed from a direction of the axial center L of the ring 23 (that is, a direction along the rotational axial center of the shaft 7). The cover 21b is formed of, for example, a transparent resin material, and has a thickness dimension enough to have flexibility. That is, the cover 21b is formed thin enough to have flexibility. By forming the cover 21b of a transparent material, the interior of the container main body 21a can be visually recognized from the outside of the housing 21.

Such a housing 21 has an internal space surrounded by the container main body 21a and the cover 21b. A contact part of the ring 23 and the brush 25 is disposed in the internal space of the housing 21 as described above. That is, the housing 21 accommodates the contact part of the ring 23 and the brush 25 in the internal space surrounded by the container main body 21a and the cover 21b.

The bearing 22 includes an outer race 22a, an inner race 22b, and a rolling element 22c, and is fitted to the container main body 21a of the housing 21 as described above. The outer race 22a is fixed to the container main body 21a as described above. The inner race 22b is fixed to the ring 23. The rolling element 22c has, for example, a spherical shape or a cylindrical shape, and a plurality of rolling elements 22c are provided between the inner race 22b and the outer race 22a. With the rolling elements 22c, the inner race 22b is made rotatable with respect to the outer race 22a.

The ring 23 is formed into a conductive tubular shape centered on the axial center L, and the shaft 7 is inserted through the ring 23. As shown in FIG. 4, the ring 23 has a small-diameter portion 23a disposed at the upper part, and a large-diameter portion 23b disposed at the lower part. The large-diameter portion 23b has an outer diameter dimension larger than the small-diameter portion 23a. An outer circumferential surface of the large-diameter portion 23b is a sliding surface with respect to the brush 25. A flange portion 23c for preventing the brush 25 from deviating from the outer circumferential surface of the large-diameter portion 23b is provided at the upper end and the lower end of the large-diameter portion 23b.

On the inner wall surface of the ring 23, an annular stepped portion 23d centered on the axial center L is provided by an enlargement in diameter of the internal space of the ring 23 on the lower part side of the ring 23. A lower surface 23e of the stepped portion 23d is a contact surface which the upper surface of the enlarged diameter portion 7a of the shaft 7 contacts. An upper end surface 23f (that is, the upper end surface of the small-diameter portion 23a) of the ring 23 is a contact surface with which a lower surface of the driven pulley 6b of the power transmission mechanism 6 contacts. In such a ring 23, the enlarged diameter portion 7a of the shaft 7 inserted therein contacts with the lower surface 23e of the stepped portion 23d, the driven pulley 6b contacts with the upper end surface 23f from above, and the ring 23 is sandwiched by the shaft 7 and the driven pulley 6b, thereby the ring being fixed to the shaft 7 and the driven pulley 6b.

The ring 23 may be formed of, for example, a material including such as gold, a gold alloy, silver, a silver alloy, platinum, a platinum alloy, copper, or a copper alloy. In addition, it is also possible to configure the ring 23 to have conductivity at least on a surface layer by applying rhodium plating, gold plating or nickel plating to the surface.

Such a ring 23 is fixed to the inner race 22b of the bearing 22. Therefore, since the inner race 22b of the bearing 22 is made rotatable with respect to the outer race 22a, the ring 23 is made rotatable around the axial center L with respect to the housing 21. Therefore, the ring 23 is rotated around the axial center L with the rotation of the driven pulley 6b and the shaft 7.

The connection plate 24 is an insulating plate member on which a conductive pattern electrically connected to the brush 25 is formed, and is fixed to the side wall of the container main body 21a of the housing 21 from the outside with a screw (not shown). The connection plate 24 is connected to a base portion of the brush 25 and supports the brush 25. That is, the electric transmission mechanism 10 has a conductive connection plate 24 which is fixed to the outer wall surface of the housing 21 and supports the brush 25. The connection plate 24 has an opening through which the fixing screw 27 is inserted, and is fixed to the housing 21 also with a fixing screw 27 in addition to the above-described screws. Further, a terminal 28a of the cable 28 is fixed to the conductive pattern of the connection plate 24 using the fixing screw 27.

The brush 25 is formed by a pair of two conductive wires. The two wire materials forming one brush 25 have the same length, and the circumferential surfaces thereof are in close contact with each other in a state of being parallel to each other. In such a brush 25, its base is fixed to the connection plate 24, and a part on a distal end side is slidably brought into contact with the circumferential surface of the large-diameter portion 23b of the ring 23. The brush 25 is set in such a posture that both the two wire materials come into contact with the circumferential surface of the large-diameter portion 23b of the ring 23. As shown in FIG. 5, the brushes 25 are provided on each of both sides of the ring 23 to sandwich the axial center L of the ring 23. That is, the brushes 25 are provided on each of both sides of the ring 23 as viewed from the direction along the axial center L of the ring 23. When an end portion of one wire material included in one brush 25 provided on one side of the ring 23 centered on the axial center L is connected to an end portion of one wire material included in one brush 25 provided on the other side of the ring 23, the wire materials are integrated. That is, one wire material is bent into a U-shape, and a portion on one end side of the wire material forms a part of one brush 25 provided on one side of the ring 23, and a portion on the other end side of the wire material forms a part of one brush 25 provided on the other side of the ring 23.

As shown in FIG. 4, two brushes 25 are provided in a vertical direction. That is, a plurality of brushes 25 are provided in a direction along the axial center L of the ring 23. Further, as described above, as shown in FIG. 5, the brushes 25 are provided on each of both sides of the ring 23 to sandwich the axial center L of the ring 23. In this way, in the present embodiment, four brushes 25 are provided in total. The brushes 25 are moved and slide on the circumferential surface of the ring 23 rotationally driven around the axial center L, and are in a state of being electrically connected to the ring 23 while rotating. At this time, since four brushes 25 are provided, it is possible to prevent all the brushes 25 from separating from the ring 23 at the same time, due to the displacement of the ring 23 due to vibration or a mechanical error, and conduction between the ring 23 and the connection plate 24 can be ensured at all times.

The grease 26 is filled into the housing 21. The grease 26 is a semisolid sealing material containing a lubricating oil of liquid component and a semisolid thickening agent. The grease 26 blocks an entry route of foreign matters from the outside of the housing 21 to the contact part of the ring 23 and the brush 25. The grease 26 is filled in the housing 21 in the state of avoiding the contact part of the ring 23 and the brush 25. Therefore, for example, it is possible to prevent the grease 26 from adhering to the surface of the ring 23 and from being rotated together with the ring 23, and it is possible to prevent the brush 25 from being pushed away by the grease 26 and prevent the ring 23 and the brush 25 from separating from each other.

Figure 6A:
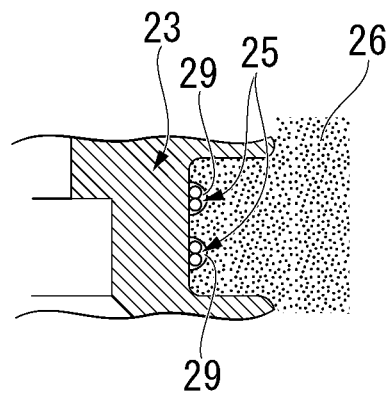
FIG. 6A is a schematic view showing an aspect in which grease moves by rotation of a ring.
Figure 6B:
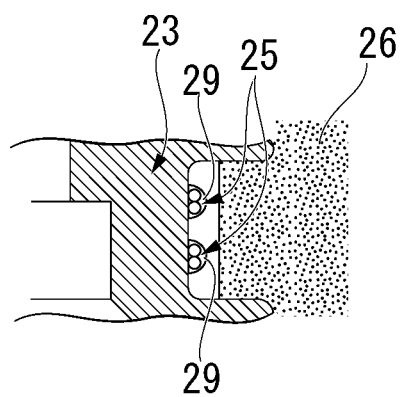
FIG. 6B is a schematic view showing an aspect in which grease moves by rotation of a ring.

Even if the grease 26 enters between the ring 23 and the brush 25 as shown in FIG. 6A, for example, at the time of manufacturing of the electric transmission mechanism 10, due to the centrifugal force caused by the rotation of the ring 23 together with the shaft 7, the grease 26 filled in for sealing purposes can be removed from the contact part of the ring 23 and the brush 25 as shown in FIG. 6B. That is, by rotating the ring 23, the grease 26 can be disposed inside the housing 21 in the state of avoiding the contact part of the ring 23 and the brush 25. As shown in FIGS. 6A and 6B, a lubricating grease 29 functioning as a lubricant adheres to the brush 25. In FIGS. 4, 5 and 7, the lubricating grease 29 is not shown. Also when the ring 23 is rotated, the lubricating grease 29 is maintained in the state of being adhered to the brush 25 due to the surface tension and the action such as force for sandwiching between the brush 25 and the ring 23. Since such a lubricating grease 29 is surrounded by the above-mentioned sealing grease 26 from the outside, the lubricating grease 29 is prevented from moving from the contact part of the ring 23 and the brush 25.

It is substantially difficult to fill the entire internal space of the housing 21 with grease 26 at the time of manufacturing. Therefore, by rotating the ring 23, the grease 26 can be easily removed from the contact part of the ring 23 and the brush 25. For this reason, it is not necessary to perform the work taking into account the fact that the grease 26 is retracted from the contact part of the ring 23 and the brush 25 at the time of the filling work of the grease 26. The filling amount of the grease 26 may be set in advance so that the grease 26 does not remain at the contact part of the ring 23 and the brush 25.

Even when the ring 23 is rotated, the lubricating grease 29 remains on the surfaces of the ring 23 and the brush 25 due to surface tension. Therefore, the sliding resistance between the ring 23 and the brush 25 can be reduced by the lubricating grease 29. The lubricating grease 29 tries to move from the contact part of the ring 23 and the brush 25 due to a capillary phenomenon caused by a minute space formed between the two wire materials forming one brush 25. However, since the grease 26 is filled into the internal space of the housing 21, the movement of the lubricating grease 29 is restricted by the grease 26, and the lubricating grease 29 can be made to stay at the contact part of the ring 23 and the brush 25.

The fixing screw 27 is a screw for fixing the terminal 28a of the cable 28 to the surface of the connection plate 24. A shaft portion of the fixing screw 27 inserted into the opening portion of the terminal 28a is screwed into the housing 21 through an opening provided in the connection plate 24, and the fixing screw 27 presses the terminal 28a against the connection plate 24 with a head portion, thereby fixing the terminal 28a to the connection plate 24. The cable 28 is fixed to the connection plate 24 by fixing screws 27 and is electrically connected to a rotating system such as the ring 23, the shaft 7, and the working electrode 8 via a fixing system such as the connection plate 24 and the brush 25. Another end of the cable 28, which is opposite to the end at which the terminal 28a is provided, is electrically connected to the outside of the detector 2.

When installing such an electric transmission mechanism 10, the shaft 7 detached from the driven pulley 6b is inserted into the ring 23, and the enlarged diameter portion 7a of the shaft 7 is caused to contact with the lower surface 23e of the stepped portion 23d provided inside the ring 23. In this state, the shaft 7 is screwed to the driven pulley 6b and is caused to contact with the lower surface of the driven pulley 6b of the upper end surface 23f of the ring 23. Therefore, the ring 23 is sandwiched from the vertical direction by the shaft 7 and the driven pulley 6b, and the electric transmission mechanism 10 is integrated with the shaft 7 and the driven pulley 6b. When the electric transmission mechanism 10 which is integrated with the shaft 7 and the like in this manner is connected to the other constituent elements of the power transmission mechanism 6, the electric transmission mechanism 10 is attached as shown in the enlarged cross-sectional view of the main part of FIG. 7. When detaching the electric transmission mechanism 10 for replacement, maintenance, and the like, the electric transmission mechanism 10 can be easily detached by following the procedure opposite to the above-described attachment procedure.

According to the electric transmission mechanism 10 and the residual chlorine analyzer 1 as described above, the tubular ring 23 is fixed to the inner race 22b of the bearing 22, and the housing 21 fixed to the outer race 22a of the bearing 22 accommodates the contact part of the ring 23 and the brush 25 therein. Therefore, the housing 21 prevents foreign matters such as wear powder generated by the operation of the power transmission mechanism 6 and corrosive gas such as chlorine gas from entering the contact part of the ring 23 and the brush 25. Therefore, according to the electric transmission mechanism 10 of the present embodiment, maintenance for maintaining conduction between the ring 23 and the brush 25 can be made unnecessary or frequency thereof can be reduced.

Furthermore, in the electric transmission mechanism 10 of the present embodiment, since the housing 21 is provided, the housing 21, the bearing 22, the ring 23 and the brush 25 are unitized. Therefore, it is possible to prevent the contact pressure and the like from unintentionally changing due to the conveying and attaching work after adjusting the contact pressure or the like of the brush 25 against the ring 23 in the factory or the like. Therefore, at a site where the residual chlorine meter 1 is installed, it is not necessary to perform operations such as adjusting a contact pressure between the brush 25 and the ring 23. According to the electric transmission mechanism 10 of the present embodiment, it is possible to reduce the burden of the work of the initial installation work and the subsequent replacement work.

The electric transmission mechanism 10 can be miniaturized by unitizing the housing 21, the bearing 22, the ring 23 and the brush 25. Furthermore, in the electric transmission mechanism 10 of the present embodiment, since one ring 23 is pivotally supported by one bearing, it is small and lightweight. Since the electric transmission mechanism 10 is small and lightweight in this manner, the residual chlorine analyzer 1 can also be made small and lightweight, and it is possible to reduce the work load of the initial installation work of the electric transmission mechanism 10 and the subsequent replacement work.

In the electric transmission mechanism 10 of the present embodiment, the housing 21 includes a container main body 21a which is fixed to the outer race 22a of the bearing 22 and encloses the contact part of the ring 23 and the brush 25 from the outside in a radial direction of the ring 23, and a cover 21b which is attachable to and detachable from the container main body 21a so that the space surrounded by the container main body 21a can be opened and closed. Therefore, by detaching the cover 21b from the container main body 21a, it is possible to easily check the internal space of the container main body 21a in which the contact part of the ring 23 and the brush 25 is accommodated. For example, by detaching the cover 21b from the container main body 21a, it is possible to easily dispose the grease 26 inside the container main body 21a.

In the electric transmission mechanism 10 of the present embodiment, the cover 21b has an opening 21b1 through which the shaft 7 is inserted and which has a diameter dimension smaller than the outer diameter dimension of the ring 23, and the circumferential edge region of the cover 21b forming the opening 21b1 is disposed to overlap the outer edge region of the ring 23 when seen from the direction along the axial center L of the ring 23. Therefore, the cover 21b which is not rotated can be disposed to be close to the ring 23 which is rotated, and the gap between the ring 23 and the cover 21b can be narrowed. Therefore, it is possible to more reliably prevent foreign matters from entering the inside of the housing 21.

The electric transmission mechanism 10 of the present embodiment has the grease 26 filled into the housing 21. Therefore, the route in which the external foreign matters lead to the contact part of the ring 23 and the brush 25 can be sealed by the grease 26, and it is possible to more reliably prevent foreign matters from reaching the contact part of the ring 23 and the brush 25. The grease 26 can prevent the lubricating grease 29 from moving due to the capillary phenomenon. Furthermore, the sealed space is defined around the contact part of the ring 23 and the brush 25 by the grease 26, the volatilization of the lubricating grease 29 can be suppressed, and it is possible to suppress the sliding resistance between the ring 23 and the brush 25 to be low over a long period of time.

The electric transmission mechanism 10 of the present embodiment has the connection plate 24 that is fixed to the outer wall surface of the housing 21 and supports the brush 25. Therefore, by fixing the brush 25 to the connection plate 24 outside the housing 21 and by fixing the connection plate to the outer wall surface of the housing 21, the housing 21 and the brush 25 can be easily integrated.

In the electric transmission mechanism 10 of the present embodiment, a plurality of brushes 25 are provided in a direction along the axial center L of the ring 23. The brushes 25 are provided on each of both sides of the ring 23 as viewed from the direction along the axial center L of the ring 23. Since a plurality of brushes 25 are provided in the present embodiment as described above, it is possible to prevent all the brushes 25 from separating from the ring 23 at the same time, and the conduction between the working electrode 8 and the converter 3 can always be secured.

In the electric transmission mechanism 10 of the present embodiment, the ring 23 has an upper end surface 23f (a first contact surface) that is directed to one side in the direction along the axial center L and contacts with the driven pulley 6b (a fixing member) to which the shaft 7 is fixed, and a lower surface 23e (a second contact surface) of the stepped portion 23d which is directed to the other side in the direction along the axial center L and contacts with the enlarged diameter portion 7a of the shaft 7. Therefore, by causing the enlarged diameter portion 7a of the shaft 7 to contact with the lower surface 23e of the stepped portion 23d and contact with the lower surface of the driven pulley 6b of the upper end surface 23f of the ring 23, the ring 23 can be sandwiched between the shaft 7 and the driven pulley 6b. Therefore, it is possible to easily fix the electric transmission mechanism 10 to the shaft 7 or the like.

Although the preferred embodiments of the present invention have been described above with reference to the accompanying drawings, it goes without saying that the present invention is not limited to the above embodiment. The shapes and combinations of the respective constituent members described in the above-described embodiments are merely examples, and various modifications can be made based on design requirements and the like without departing from the gist of the present invention.

Figure 8:
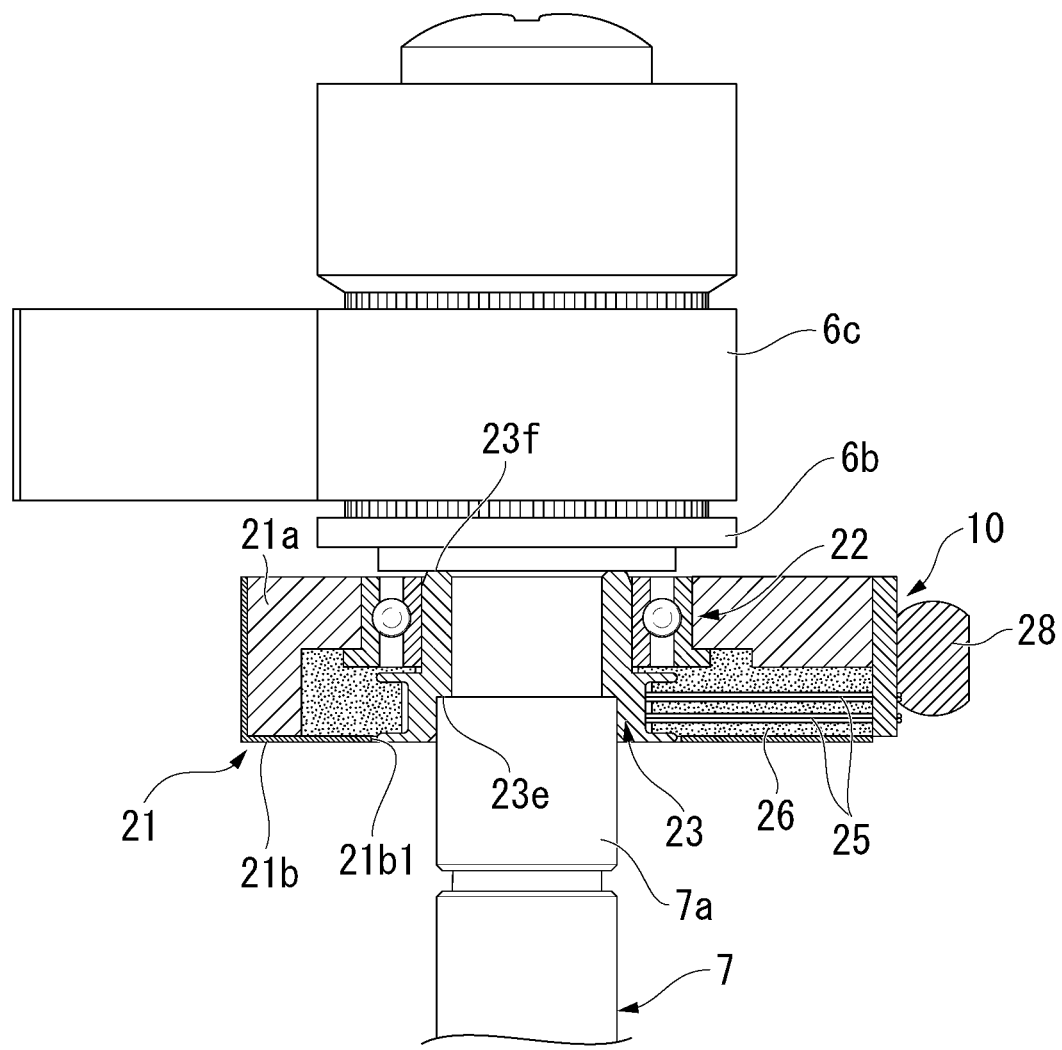
FIG. 8 is an enlarged cross-sectional view of the main part of the residual chlorine analyzer including a first modified example of the electric transmission mechanism according to the embodiment of the present invention.

For example, in the above-described embodiment, the configuration in which the cover 21b has an opening 21b1 having a diameter dimension smaller than the outer diameter dimension of the ring 23, and the circumferential edge region of the cover 21b forming the opening 21b1 is disposed to overlap the outer edge region of the ring 23 as viewed from the direction along the axial center L of the ring 23 has been adopted. However, the present invention is not limited thereto. FIG. 8 is an enlarged cross-sectional view of a main part of a first modified example of the electric transmission mechanism 10. As shown in the drawing, it is also possible to set the opening 21b1 of the cover 21b to be larger than the outer diameter dimension of the ring 23. By adopting such a configuration, as shown in FIG. 8, the cover 21b can be disposed near the side of the lower end of the ring 23, and thus the thickness dimension of the housing 21 can be reduced. Therefore, it is possible to further reduce the thickness of the electric transmission mechanism 10.

Figure 9A:
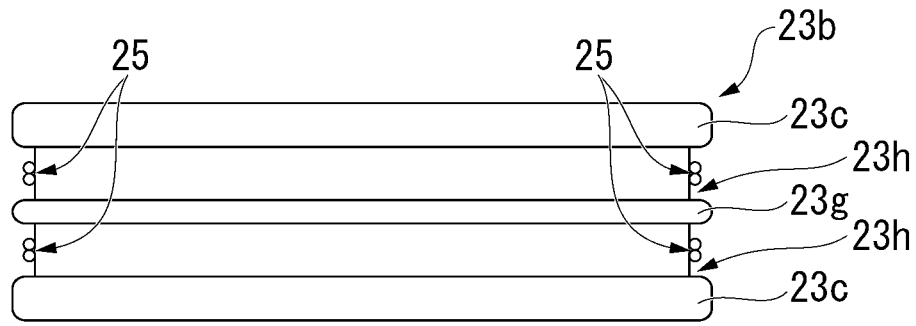
FIG. 9A is a schematic diagram of a ring and a brush included in a second modified example of the electric transmission mechanism according to the embodiment of the present invention.

FIG. 9A is a schematic diagram of 25 and the large-diameter portion 23b of the ring 23 in a second modified example of the electric transmission mechanism 10. As shown in the drawing, an annular partition wall 23g may be provided on the circumferential surface of the large-diameter portion 23b of the ring 23, and an annular groove portion 23h capable of accommodating the brush 25 by the flange portion 23c, the circumferential surface of the large-diameter portion 23b and the partition wall 23g may be formed. By disposing the brush 25 in such an annular groove portion 23h, the sealability of the grease 26 is improved, and it is possible to suppress the volatilization of the lubricating grease 29 adhered to the brush 25. Therefore, the space in which the brush 25 is disposed can constantly be maintained in a moist atmosphere, and the frictional resistance between the ring 23 and the brush 25 can be kept low for a long period of time.

Figure 9B:
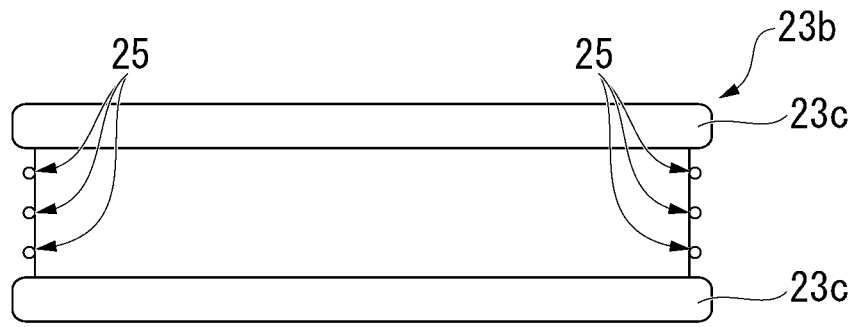
FIG. 9B is a schematic diagram of a ring and a brush included in a third modified example of the electric transmission mechanism according to the embodiment of the present invention.
Figure 9C:
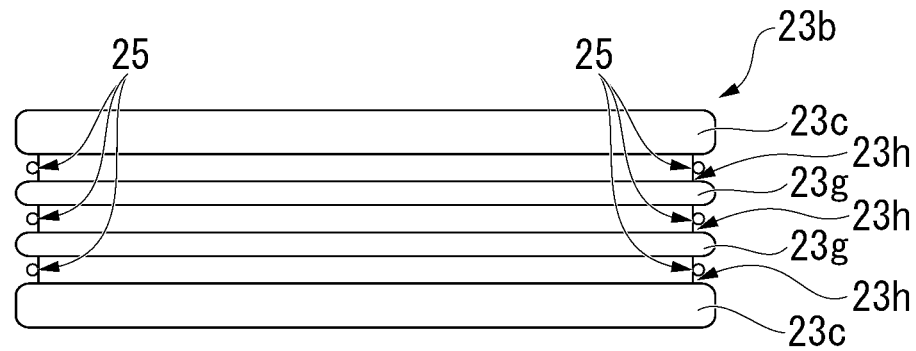
FIG. 9C is a schematic diagram of a ring and a brush included in a fourth modified example of the electric transmission mechanism according to the embodiment of the present invention.

FIG. 9B is a schematic diagram of the brush 25 and the large-diameter portion 23b of the ring 23 in a third modified example of the electric transmission mechanism 10. As shown in this drawing, it is also possible to form the brush 25 with a single wire material. By forming the brush 25 with a single wire material in this manner, there is no minute space between the wire materials, and it is possible to prevent the lubricating grease 29 from moving due to the capillary phenomenon. Therefore, the frictional resistance between the ring 23 and the brush 25 can be suppressed to be low over a long period of time. FIG. 9C is a schematic view of the large-diameter portion 23b and the brush 25 of the ring 23 in a fourth modified example of the electric transmission mechanism 10. As shown in this drawing, the brush 25 may be formed of a single wire material, and the above-described partition wall 23g may be provided between the brush 25 and the brush 25. Therefore, each of the brushes 25 can be disposed in the annular groove portion 23h.

In the above embodiment, the configuration in which the brushes 25 are disposed on both sides of the ring 23 when viewed from the direction along the axial center L of the ring 23 has been described. However, the present invention is not limited thereto, and it is also possible to adopt a configuration in which the brush 25 is arranged only on one side of the ring 23.

In the above-described embodiment, the configuration in which the electric transmission mechanism 10 is fixed by sandwiching the ring 23 between the driven pulley 6b and the shaft 7 has been described. However, the present invention is not limited thereto. For example, it is also possible to adopt a configuration in which the shaft 7 and the ring 23 are fixed by being screwed together or a configuration in which the housing 21 is fixed to the base unit 4 or the like.

The present invention can be applied to an electric transmission mechanism for securing the conduction between a rotary system having an electrode and another fixed system.

It is also possible to use oil instead of the lubricating grease 29 in the above embodiment. For example, it is also possible to use oil instead of lubricating grease 29 without enclosing the grease 26 inside the housing 21. Only the lubricating grease 29 among the grease 26 and the lubricating grease 29 may be provided, without enclosing the grease 26 inside the housing 21. Grease of the same type may be used for the grease 26 and the lubricating grease 29 in the above embodiment.

What is claimed is:

1. An electric transmission mechanism comprising:
    a tubular ring fixed to a shaft electrically connected to an electrode;
    at least one brush slidably contacting with a circumferential surface of the tubular ring;
        a bearing including an inner race fixed to the tubular ring; and
        a housing which is fixed to an outer race of the bearing and accommodates a contact part of the tubular ring and the at least one brush therein.

2. The electric transmission mechanism according to claim 1, wherein
    the housing comprises:
    a container main body which is fixed to the outer race of the bearing and surrounds the contact part of the tubular ring and the at least one brush from a radially outer side of the tubular ring; and
    a cover which is detachably attached to the container main body to open and close a space surrounded by the container main body.

3. The electric transmission mechanism according to claim 2, wherein:
    the cover has an opening through which the shaft is inserted and which has a diameter dimension smaller than an outer diameter dimension of the tubular ring, and
    a peripheral edge region of the cover forming the opening is disposed to overlap an outer edge region of the tubular ring when viewed from a direction along an axial center of the tubular ring.

4. The electric transmission mechanism according to claim 1, further comprising
    a grease filled inside the housing.

5. The electric transmission mechanism according to claim 1, further comprising
    a connection plate which is fixed to an outer wall surface of the housing and supports the at least one brush.

6. The electric transmission mechanism according to claim 1, wherein
    the at least one brush includes a single wire material.

7. The electric transmission mechanism according to claim 1, wherein the at least one brush comprises a plurality of brushes, and
    the plurality of brushes are disposed in a direction along an axial center of the tubular ring.

8. The electric transmission mechanism according to claim 1, wherein the at least one brush comprises a plurality of brushes, and
    at least one of the plurality of brushes is disposed on each of both sides of the tubular ring when seen from a direction along an axial center of the tubular ring.

9. The electric transmission mechanism according to claim 1, wherein
    the tubular ring has an annular groove portion disposed on the circumferential surface to accommodate the at least one brush.

10. The electric transmission mechanism according to claim 1, wherein
    the tubular ring has a first contact surface which is directed to one side in a direction along an axial center and contacts with a fixing member to which the shaft is fixed, and a second contact surface which is directed to the other side in the direction along the axial center and contacts with an enlarged diameter portion of the shaft.

11. An ion meter comprising;
    a motor;
    a first electrode rotatable by power of the motor via a shaft; and
        an electric transmission mechanism comprising:
        a tubular ring fixed to the shaft electrically connected to the first electrode;
        at least one brush slidably contacting with a circumferential surface of the tubular ring;
        a bearing including an inner race fixed to the tubular ring; and
        a housing which is fixed to an outer race of the bearing and accommodates a contact part of the tubular ring and the at least one brush therein.

12. The ion meter according to claim 11, wherein
    the housing comprises:
    a container main body which is fixed to the outer race of the bearing and surrounds the contact part of the tubular ring and the at least one brush from a radially outer side of the tubular ring; and
    a cover which is detachably attached to the container main body to open and close a space surrounded by the container main body.

13. The ion meter according to claim 12, wherein:
    the cover has an opening through which the shaft is inserted and which has a diameter dimension smaller than an outer diameter dimension of the tubular ring, and
    a peripheral edge region of the cover forming the opening is disposed to overlap an outer edge region of the tubular ring when viewed from a direction along an axial center of the tubular ring.

14. The ion meter according to claim 11, further comprising
    a grease filled inside the housing.

15. The ion meter according to claim 11, further comprising
    a connection plate which is fixed to an outer wall surface of the housing and supports the at least one brush.

16. The ion meter according to claim 11, wherein
    the at least one brush includes a single wire material.

17. The ion meter according to claim 11, further comprising:
    a second electrode disposed lateral to the first electrode;
    a converter configured to apply a voltage to the first electrode and the second electrode; and
    a measurement tank capable of accommodating liquid to be measured and disposed to surround the first electrode and the second electrode.

18. The ion meter according to claim 17, wherein:
    the shaft includes a conductive material, and
    the shaft electrically connects the first electrode with the converter via the electric transmission mechanism.

19. The ion meter according to claim 17, wherein
the converter is configured to apply the voltage to the first electrode and the second electrode via the electric transmission mechanism and the shaft while the first electrode is rotated by the power of the motor.

20. The ion meter according to claim 19, wherein
the converter is configured to perform measurement of the liquid based on a value of a current flowing through the first electrode, wherein the value of the current is inputted to the converter via the shaft and the electric transmission mechanism.

\* \* \* \* \*